(12) United States Patent
Ichikawa

(10) Patent No.: US 11,611,235 B2
(45) Date of Patent: Mar. 21, 2023

(54) WIRELESS POWER TRANSFER HOLDER

(71) Applicant: TOYODA GOSEI CO., LTD., Kiyosu (JP)

(72) Inventor: Yuhki Ichikawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 180 days.

(21) Appl. No.: 17/128,034

(22) Filed: Dec. 19, 2020

(65) Prior Publication Data

US 2021/0273485 A1 Sep. 2, 2021

(30) Foreign Application Priority Data

Feb. 27, 2020 (JP) .............................. JP2020-031991

(51) Int. Cl.
*H02J 50/00* (2016.01)
*H02J 7/00* (2006.01)
*B60R 16/03* (2006.01)
*B60R 7/04* (2006.01)
*H02J 50/10* (2016.01)

(52) U.S. Cl.
CPC .............. *H02J 50/005* (2020.01); *B60R 7/04* (2013.01); *B60R 16/03* (2013.01); *H02J 7/0044* (2013.01); *H02J 50/10* (2016.02)

(58) Field of Classification Search
CPC ........ H02J 50/005; H02J 50/10; H02J 7/0044; B60R 7/04; B60R 16/03

USPC ......................................................... 307/104
See application file for complete search history.

(56) References Cited

U.S. PATENT DOCUMENTS 10,486,615 B1 11/2019 Shibata et al.

FOREIGN PATENT DOCUMENTS

JP 2012-224237 A 11/2012
JP 2020-55360 A 4/2020

*Primary Examiner* — Michael R. Fin
(74) *Attorney, Agent, or Firm* — Posz Law Group, PLC

(57) ABSTRACT

A wireless power transfer holder composed of a receiving space formed by first walling portions to be provided opposite side surfaces, respectively, defining width directions of an electronic device, second walling portions to be provided opposite front and back surfaces, respectively, defining thickness directions of the electronic device, a bottom portion, and an open portion formed opposite the bottom portion, first and second supporting members movable symmetrically forward or backward in the width directions from the first walling portions, respectively, toward the electronic device, to exert bias forces on the side surfaces, respectively, of the electronic device, and an inductive power transferring device mounted on one of the second walling portions to inductively transfer an electric power in a non-contact manner to the electronic device held in the receiving space. The first and second supporting members are configured to be moved while having symmetrical tilts, respectively, toward the electronic device.

10 Claims, 10 Drawing Sheets

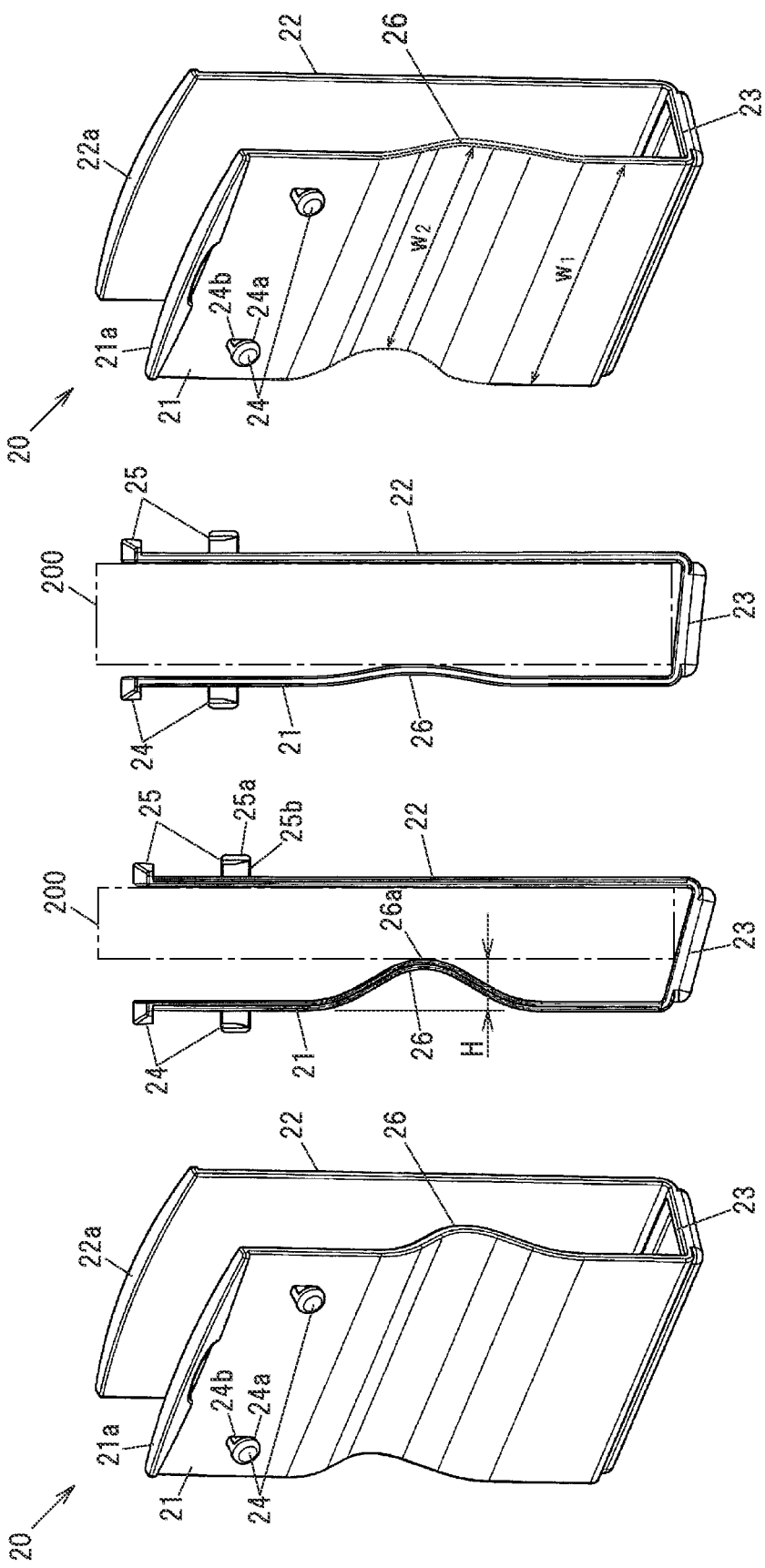

WIRELESS POWER TRANSFER HOLDER

CROSS-REFERENCE TO RELATED APPLICATIONS

The present application is based on Japanese patent application No. 2020-031991 filed on Feb. 27, 2020, the entire contents of which are incorporated herein by reference.

TECHNICAL FIELD

The present invention relates to a wireless power transfer holder.

BACKGROUND ART

Various types of structures have been proposed that provide a structure for an interior of a vehicle to be fitted with a smartphone. A structure to be fitted with a smartphone is installed on a center cluster of the vehicle, and this structure to be fitted with a smartphone is composed of a box shaped body having an opening and a specified space on the center cluster, and a door for closing the opening of the box shaped body. The structure to be fitted with a smartphone is of a type that the smartphone is being fitted to an interior member by opening the door of the box shaped body, placing the smartphone into the box shaped body through the opening of the box shaped body, and closing the door of the box shaped body. The door of the box shaped body is being acted on by bias forces from a spring, to hold the smartphone in opposite width directions, respectively, of the smartphone (see, for example, JP 2012/224237 A).

SUMMARY OF INVENTION

The structure to be fitted with a smartphone described in JP 2012/224237 A has been designed to hold one right portion and one left portion of an electronic device such as the smartphone from the opposite width directions, respectively, of the electronic device. Thus, there has been a problem with the stability of the posture of the held electronic device being poor. In addition, when an upper and lower holding structure to be fitted with the electronic device has been employed to hold two right upper and lower portions and two left upper and lower portions in the opposite width directions, respectively, of the electronic device, there has been a problem with the insertability in the insertion of the electronic device becoming poor due to an increase in friction and the like.

It is an object of the present invention to provide a wireless power transfer holder which is designed to be excellent in the insertability and the holding stability for an electronic device.

In accordance with one aspect of the present invention, wireless power transfer holders as defined in [1] to [10] below are provided.

[1] A wireless power transfer holder, comprising: a holder case including a receiving space formed by first opposite lateral walling portions, which are being configured to be provided opposite to opposite side surfaces, respectively, defining opposite width directions of an electronic device, second opposite lateral walling portions, which are being configured to be provided opposite to a front surface and a back surface, respectively, defining opposite thickness directions of the electronic device, a bottom portion, which is closing one end of a spatial portion formed by the first opposite lateral walling portions and the second opposite lateral walling portions, and an open portion, which is being formed opposite to the bottom portion, so that the electronic device is inserted and received through the open portion into the receiving space in the holder case; a supporting mechanism including a first constituent supporting member and a second constituent supporting member, which are being configured in such a manner as to be movable symmetrically forward or backward in the opposite width directions of the electronic device from the first opposite lateral walling portions, respectively, of the holder case toward the electronic device, so that when the electronic device is being inserted and received in the receiving space in the holder case, the first constituent supporting member and the second constituent supporting member of the supporting mechanism are exerting bias forces on the opposite side surfaces, respectively, of the electronic device; and an inductive power transferring device mounted on one of the second opposite lateral walling portions of the holder case to inductively transfer an electric power in a non-contact manner to the electronic device held in the receiving space in the holder case, wherein the supporting mechanism is being configured in such a manner that the first constituent supporting member and the second constituent supporting member are to be moved while having symmetrical tilts, respectively, toward the electronic device.

[2] The above defined wireless power transfer holder may be configured in such a manner that the supporting mechanism is being configured in such a manner that when the electronic device is being inserted in the receiving space in the holder case, directions of the respective tilts of the first constituent supporting member and the second constituent supporting member, i.e., directions in which the first constituent supporting member and the second constituent supporting member, respectively, are being moved backward by being pushed by the electronic device make symmetrical acute angles, respectively, with a direction in which the electronic device is being inserted.

[3] Further, the above defined wireless power transfer holder may be configured in such a manner that the supporting mechanism is being configured in such a manner that the first constituent supporting member is to be brought into contact with two portions of one of the opposite side surfaces of the electronic device, while the second constituent supporting member is to be brought into contact with two portions of an other of the opposite side surfaces of the electronic device.

[4] Further, the above defined wireless power transfer holder may be configured in such a manner that the holder case includes an inner member received in an attachable and detachable manner in the receiving space therein, so that when the electronic device is being inserted and received in the holder case, the inner member is able to hold the electronic device in the opposite thickness directions of the electronic device.

[5] Further, the above defined wireless power transfer holder may be configured in such a manner that the supporting mechanism is being provided on an other of the second opposite lateral walling portions of the holder case being not mounted with the inductive power transferring device, and each of the first opposite lateral walling portions of the holder case includes a respective first open portion thereon, so that when the electronic device is being inserted and received in the holder case, the first constituent supporting member and the second constituent supporting member of the supporting mechanism are exerting the bias forces on the opposite side surfaces, respectively, of the electronic device through the respective first open portions of the first opposite lateral walling portions, respectively, of the holder case.

[6] Further, the above defined wireless power transfer holder may be configured in such a manner that the supporting mechanism is being provided on an other of the second opposite lateral walling portions of the holder case being not mounted with the inductive power transferring device, and the other of the second opposite lateral walling portions of the holder case includes four second open portions therein, so that when the electronic device is being inserted and received in the holder case, the first constituent supporting member and the second constituent supporting member of the supporting mechanism are exerting the bias forces on the opposite side surfaces, respectively, of the electronic device through respective two of the four second open portions in the other of the second opposite lateral walling portions of the holder case.

[7] Further, the above defined wireless power transfer holder may be configured in such a manner as to further comprise a pinion gear being supported in a pivotal manner on the other of the second opposite lateral walling portions of the holder case, and the first constituent supporting member of the supporting mechanism includes a first rack geared portion thereon, while the second constituent supporting member of the supporting mechanism includes a second rack geared portion thereon, with the first rack geared portion of the first constituent supporting member and the second rack geared portion of the second constituent supporting member being meshed to the pinion gear in such a manner that the first rack geared portion of the first constituent supporting member and the second rack geared portion of the second constituent supporting member face each other, so that the first constituent supporting member and the second constituent supporting member of the supporting mechanism are able to be moved in a symmetrical and synchronous manner in the opposite width directions, respectively, of the electronic device.

[8] Further, the above defined wireless power transfer holder may be configured in such a manner that the electronic device is to be held in the receiving space in the holder case in such a manner as to remain in contact with a side of the bottom portion of the holder case.

[9] Further, the above defined wireless power transfer holder may be configured in such a manner as to further comprise a damper member including a meshing gear thereon to be meshed to the pinion gear, and being mounted on the other of the second opposite lateral walling portions of the holder case in such a manner that the pinion gear and the meshing gear are being meshed to each other.

[10] Further, the above defined wireless power transfer holder may be configured in such a manner as to further comprise an elastic member being connected between the first constituent supporting member and the second constituent supporting member of the supporting mechanism, so that when the electronic device is being inserted and received in the receiving space in the holder case, the first constituent supporting member and the second constituent supporting member of the supporting mechanism are transmitting the bias forces being produced by the elastic member to the opposite side surfaces, respectively, of the electronic device.

Advantageous Effects of Invention

According to the present invention, it is possible to provide the wireless power transfer holder which is designed to be excellent in the insertability and the holding stability for the electronic device.

BRIEF DESCRIPTION OF DRAWINGS

FIG. 5A is a stereographic perspective view showing a shape of an inner member.

FIG. 5B is a cross-sectional view showing the inner member with an electronic device thin in opposite thickness directions of the electronic device being held therein.

FIG. 5C is a cross-sectional view showing the inner member with an electronic device thick in the opposite thickness directions of the electronic device being held therein.

FIG. 5D is a stereographic perspective view showing a shape of an inner member showing a modification in which a width dimension of a protruding portion of the inner member is being configured small.

DESCRIPTION OF EMBODIMENTS (First Embodiment)

Figure 1:
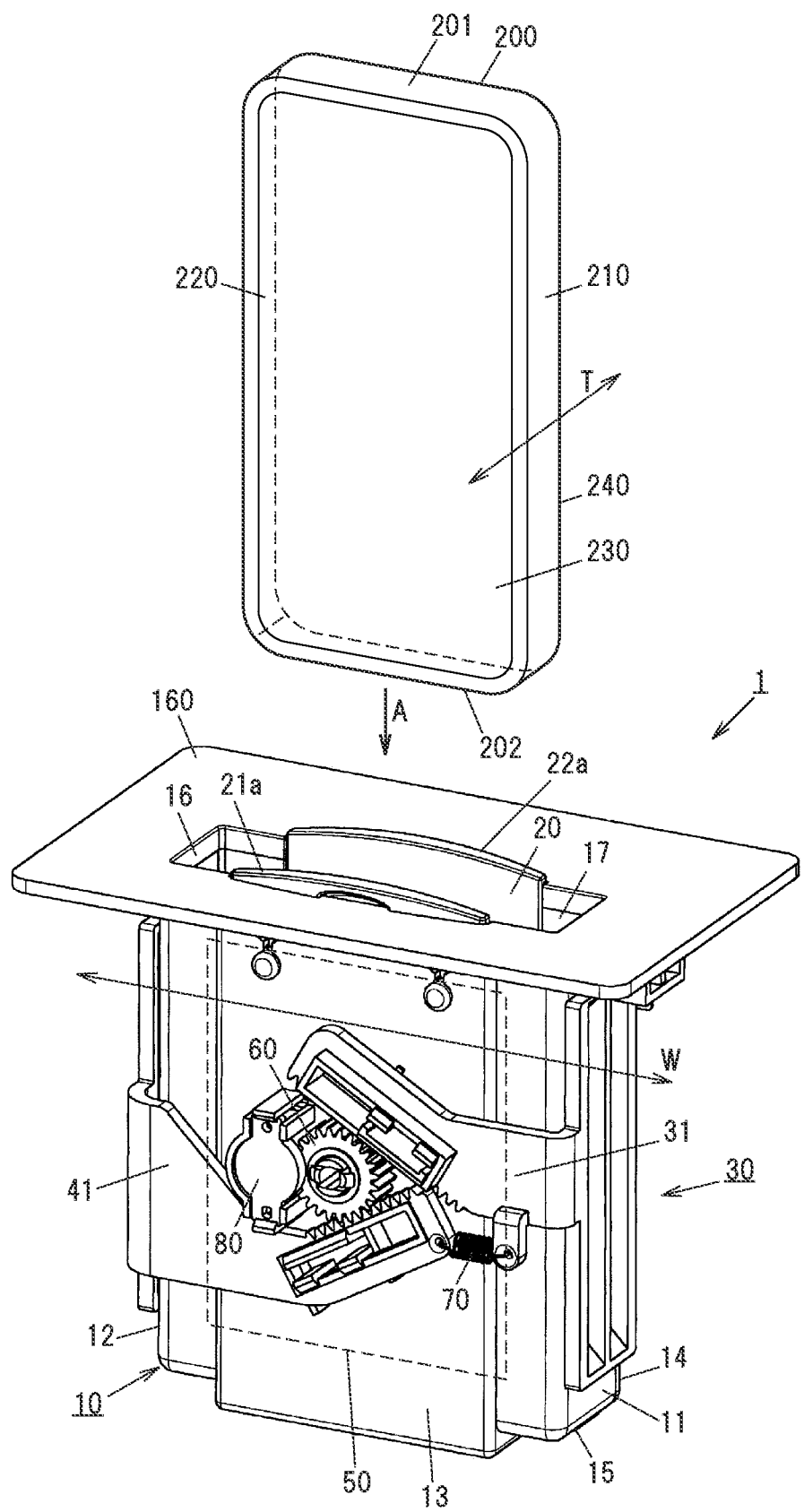
FIG. 1 is a stereographic perspective view showing an overall configuration of a wireless power transfer holder according to a first embodiment of the present invention.

As shown in FIG. 1, a wireless power transfer holder 1 according to an embodiment of the present invention is being configured in such a manner as to include a holder case 10 including a receiving space 17, which is being formed by first opposite lateral walling portions 11 and 12, which are being configured to be provided opposite to opposite side surfaces 210 and 220, respectively, defining opposite width directions W of an electronic device 200, second opposite lateral walling portions 13 and 14, which are being configured to be provided opposite to a front surface 230 and a back surface 240, respectively, defining opposite thickness directions T of the electronic device 200, a bottom portion 15, which is closing one end of a spatial portion formed by the first opposite lateral walling portions 11 and 12 and the second opposite lateral walling portions 13 and 14, and an open portion 16, which is being formed opposite to the bottom portion 15, so that the electronic device 200 is inserted and received through the open portion 16 into the receiving space 17 in the holder case 10, a supporting mechanism 30 including a first constituent supporting member 31 and a second constituent supporting member 41, which are being configured in such a manner as to be movable symmetrically forward or backward in the opposite width directions W of the electronic device 200 from the first opposite lateral walling portions 11 and 12, respectively, of the holder case 10 toward the electronic device 200, so that when the electronic device 200 is being inserted and received in the receiving space 17 in the holder case 10, the first constituent supporting member 31 and the second constituent supporting member 41 of the supporting mechanism 30 are exerting bias forces on the opposite side surfaces 210 and 220, respectively, of the electronic device 200, and an inductive power transferring device 50, which is being mounted on one second lateral walling portion 14 of the second opposite lateral walling portions 13 and 14 of the holder case 10 to inductively transfer an electric power in a non-contact manner to the electronic device 200 held in the receiving space 17 in the holder case 10, wherein the supporting mechanism 30 is being configured in such a manner that the first constituent supporting member 31 and the second constituent supporting member 41 are to be moved while having symmetrical tilts, respectively, toward the electronic device 200. It should be noted that transferring an electric power to the electronic device 200 includes charging the electronic device 200.

In the wireless power transfer holder 1 according to the embodiment of the present invention, the electronic device 200, such as a mobile phone or a smartphone or the like, to which the electric power is to be inductively transferred in a non-contact manner, is to be inserted in an A direction as shown in FIG. 1, and be received with an upper portion 201 of the electronic device 200 protruding out from the wireless power transfer holder 1. The electronic device 200 received in the holder case 10 is charged by the electric power being inductively transferred in a non-contact manner by the inductive power transferring device 50.

Figure 2:
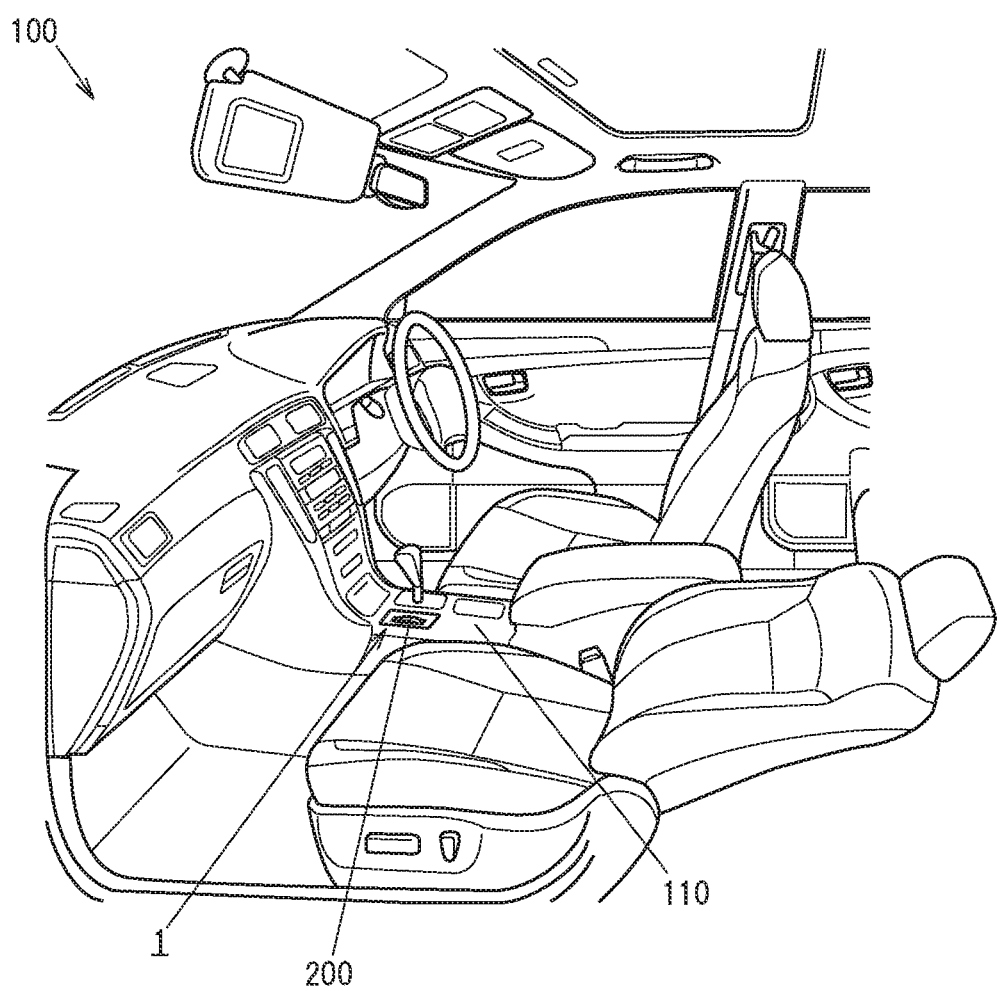
FIG. 2 is a stereographic perspective view showing one example in which the wireless power transfer holder is being mounted in a vehicle, and showing an interior of the vehicle showing a case in which the wireless power transfer holder is being mounted on a center console.

As shown in FIG. 2, for example, the wireless power transfer holder 1 is used by being mounted on a center console 110 or the like in a main body portion of a vehicle 100.

The electronic device 200 is to be positioned relative to the inductive power transferring device 50 by being held in the holder case 10 by an inner member 20 and the supporting mechanism 30, and is to be charged by the electric power being inductively transferred in a non-contact manner by the inductive power transferring device 50. Since the inner member 20 is being formed of a soft material, it is possible to configure the electronic device holding structure in which the front surface 230 of the electronic device 200, which serves as an operation surface and a display surface of the electronic device 200, is not easily damaged. Further, since the supporting mechanism 30 is being configured to allow the first constituent supporting member 31 and the second constituent supporting member 41, which are being formed of a hard material, to exert the bias forces on the opposite side surfaces 210 and 220, respectively, of the electronic device 200 in such a manner as to sandwich the opposite side surfaces 210 and 220 of the electronic device 200 between the first constituent supporting member 31 and the second constituent supporting member 41 from the opposite sides, respectively, of the electronic device 200, the supporting mechanism 30 is able to hold two upper and lower portions of the side surface 210 and two upper and lower portions of the side surface 220 of the electronic device 200.

Holding the electronic device 200 with the inner member 20 is referred to as a soft type supporting (a soft type holding). Also, holding the electronic device 200 with the first and second constituent supporting members 31 and 41 of the supporting mechanism 30 is referred to as a hard type supporting (a hard type holding). The soft type supporting refers to holding the electronic device 200 by the entire body including its portions to be brought into abutment with the electronic device 200 being formed of a soft member. Also, the hard type supporting refers to holding the electronic device 200 by the portions to be brought into abutment with the electronic device 200 and the first and second constituent supporting members 31 and 41 of the supporting mechanism 30 being each formed of a hard member, and by the holding force for the electronic device 200 being produced by an elastic member such as a spring or the like which is included in the supporting mechanism 30. That is, the wireless power transfer holder 1 according to the present embodiment is one configured as a hybrid supporting structure in which the electronic device 200 such as a smartphone or a mobile device or the like is to be held in the opposite thickness directions T of the electronic device 200 by the soft type supporting, while the electronic device 200 is to be held in the opposite width directions (the opposite lateral width directions when vertically shaped) of the electronic device 200 by the hard type supporting.

(Holder Case 10)

Figure 3:
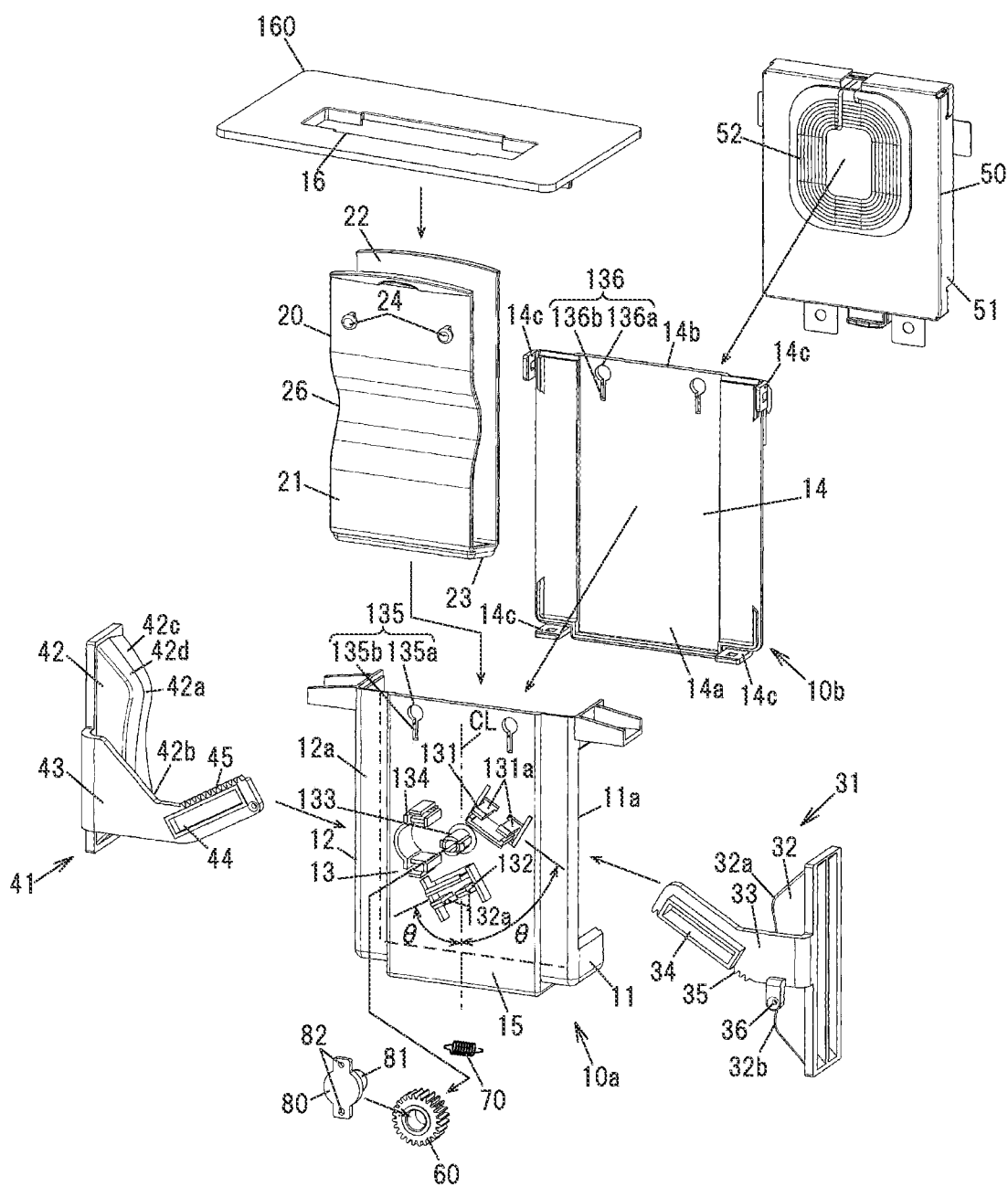
FIG. 3 is an exploded perspective view for explaining each constituent part of the wireless power transfer holder according to the first embodiment of the present invention.

As shown in FIG. 3, the holder case 10 is being configured in a bottomed box shape formed by making a first holder case 10a, which is constituted by the first opposite lateral walling portions 11 and 12, the second lateral walling portion 13, and the bottom portion 15, and a second holder case 10b, which is constituted mainly by the second lateral walling portion 14, integral with each other. The second constituent holder case 10b of the holder case 10 is being configured in such a manner that a front surface 14a of the second lateral walling portion 14 is configured as a surface to be provided opposite to the electronic device 200, while a back surface 14b of the second lateral walling portion 14 is configured as a surface to be mounted with the inductive power transferring device 50 thereon.

The first opposite lateral walling portions 11 and 12 of the first constituent holder case 10a of the holder case 10 are being formed with first open portions 11a and 12a, respectively, thereon in which the first constituent supporting member 31 and the second constituent supporting member 41, respectively, of the supporting mechanism 30 are arranged in such a manner as to be movable forward or backward in the opposite lateral directions of the electronic device 200.

The second lateral walling portion 13 of the first constituent holder case 10a of the holder case 10 is being formed with a first supporting member supporting portion 131 thereon, which supports the first constituent supporting member 31 of the supporting mechanism 30 in such a manner that the first constituent supporting member 31 of the supporting mechanism 30 is movable (slidable) while having a tilt toward the electronic device 200. The first supporting member supporting portion 131 is being configured in such a manner as to include two supporting pieces 131a thereon, which slidably support the first constituent supporting member 31 of the supporting mechanism 30. As shown in FIG. 3, the first supporting member supporting portion 131 is being arranged in such a manner as to have a tilt angle θ with respect to a central axis CL of the holder case 10 being taken in the A direction in which the electronic device 200 shown in FIG. 1 is to be inserted. The tilt angle θ for the first supporting member supporting portion 131 is, for example, 60 degrees, and is being set at an acute angle of not larger than 90 degrees.

Likewise, the second lateral walling portion 13 of the first constituent holder case 10a of the holder case 10 is being formed with a second supporting member supporting portion 132 thereon, which supports the second constituent supporting member 41 of the supporting mechanism 30 in such a manner that the second constituent supporting member 41 of the supporting mechanism 30 is movable (slidable) relative to the first constituent supporting member 31 of the supporting mechanism 30 while having a symmetrical tilt with respect to the central axis CL of the holder case 10. The second supporting member supporting portion 132 is being configured in such a manner as to include two supporting pieces 132a thereon, which slidably support the second constituent supporting member 41 of the supporting mechanism 30. As shown in FIG. 3, the second supporting member supporting portion 132 is being arranged relative to the first supporting member supporting portion 131 in such a manner as to have the same tilt angle θ as the tilt angle θ of the first supporting member supporting portion 131 symmetrically with respect to the central axis CL of the holder case 10. The tilt angle θ for the second supporting member supporting portion 132 is, for example, 60 degrees, and is being set at an acute angle of not larger than 90 degrees.

As shown in FIG. 3, the second constituent supporting member 41 of the supporting mechanism 30 is being configured in such a manner as to be movable (slidable) relative to the first constituent supporting member 31 of the supporting mechanism 30 symmetrically with respect to the central axis CL of the holder case 10. Therefore, as shown in FIG. 3, the tilt angle θ for the second supporting member supporting portion 132 shown above is being configured relative to the tilt angle θ for the first supporting member supporting portion 131 symmetrically in right and left with respect to the central axis CL of the holder case 10.

The second lateral walling portion 13 of the first constituent holder case 10a of the holder case 10 is being provided with a pivotal shaft 133 thereon, which is being configured to support a pinion gear 60 in a pivotal manner that is being configured to be meshed to respective rack geared portions 35 and 45 of the first constituent supporting member 31 and the second constituent supporting member 41 of the supporting mechanism 30.

The second lateral walling portion 13 of the first constituent holder case 10a of the holder case 10 is being provided with a damper fixing portion 134 thereon, which is being configured to fix a damper member 80 including a meshing gear 81 thereon that is being configured to be meshed to the pinion gear 60. The damper member 80 is being configured to be fitted to the first constituent holder case 10a of the holder case 10 by two portions 82 to be fitted being fixed to the damper fixing portion 134 on the second lateral walling portion 13 of the first constituent holder case 10a of the holder case 10.

Further, an upper portion of the second lateral walling portion 13 of the first constituent holder case 10a of the holder case 10 are being formed with, for example, two latching portions 135 therein, which are being configured to latch the inner member 20. Each of the two latching portions 135 is constituted by a respective hole portion 135a into which a latching protruding portion of the inner member 20 is being configured to be insertable, and a respective elongated hole portion 135b, which is being formed in communication with the respective hole portion 135a.

The second constituent holder case 10b of the holder case 10 is being formed with, for example, four engaging portions 14c thereon, and the four engaging portions 14c are assembled to and made integral with latching portions (not shown) respectively of the first constituent holder case 10a of the holder case 10. This results in the holder case 10 being configured in a bottomed box shape.

For example, an upper portion of the second lateral walling portion 14 of the second constituent holder case 10b of the holder case 10 are being formed with, for example, two latching portions 136 therein, which are being configured to latch the inner member 20. Each of the two latching portions 136 is constituted by a respective hole portion 136a into which a latching protruding portion of the inner member 20 is being configured to be insertable, and a respective elongated hole portion 136b, which is being formed in communication with the respective hole portion 136a.

As shown in FIGS. 1 and 3, the holder case 10 is being mounted with an upper panel 160 on an open portion 16 side of the holder case 10. The upper panel 160 is being formed with the open portion 16 into which the electronic device 200 is to be inserted. By the upper panel 160 being mounted to the holder case 10, the open portion 16 of the upper panel 160 serves as the open portion for the holder case 10.

(Inner Member 20)

The inner member 20 is one configured to be received in an attachable and detachable manner in the receiving space 17 in the holder case 10, so as to be able to hold the electronic device 200 in the opposite thickness directions T of the electronic device 200 shown in FIG. 1. Being able to hold the electronic device 200 with the inner member 20 refers to maintaining the electronic device 200 in a state of not being easily moved in the opposite thickness directions T of the electronic device 200 by including a member that at least supports the electronic device 200 in the opposite thickness directions T of the electronic device 200. It should be noted that, in the present embodiment, in the case of the electronic device 200 being thin in thickness, the supporting mechanism 30 is able to hold the electronic device 200 in the opposite thickness directions T of the electronic device 200. Therefore, the inner member 20 may be able to hold the electronic device 200 in the opposite thickness directions T of the electronic device 200, and in the case of the electronic device 200 of a thickness equal to or thinner than a predetermined thickness, the electronic device 200 is held in the opposite thickness directions T of the electronic device 200 by the supporting mechanism 30, or in the case of the electronic device 200 of a thickness equal to or thicker than the predetermined thickness, the electronic device 200 is held in the opposite thickness directions T of the electronic device 200 by the inner member 20. Further, the inner member 20 is an inner member that is mounted in a replaceable manner in the receiving space 17 in the holder case 10.

The inner member 20 is being formed of a soft material having an elasticity, such as a soft resin or the like. The soft resin is preferably a resin being excellent in heat insulating properties, for example, a urethane resin, a melamine resin, or the like. In addition, besides, as the soft material having an elasticity for the inner member 20, it is also possible to use a rubber or the like being excellent in heat insulating properties, and for example, it is possible to use a foamed elastomer, a silicone sponge, or the like as well.

As shown in FIG. 5A, the inner member 20 is being formed in a bottomed U shape. The inner member 20 is constituted schematically by a front surface portion 21, which is being configured to be provided opposite to the front surface 230 of the electronic device 200, a back surface portion 22, which is being configured to be provided opposite to the back surface 240 of the electronic device 200, and a bottom portion 23, which is being configured to serve as a bottom for the inner member 20.

Further, upper portions of the front surface portion 21 and the back surface portion 22 of the inner member 20 are being formed with flanged portions 21a and 22a, respectively, thereon, and as shown in FIG. 1, the flanged portions 21a and 22a are being configured in such a manner as to be protruded from the upper panel 160, with the flanged portions 21a and 22a being mounted in the receiving space 17 in the holder case 10. This makes it possible to easily attach or detach the flanged portions 21a and 22a to or from the holder case 10 by pinching them with fingers or the like and pulling them upward.

As shown in FIGS. 5A and 5B, an upper portion of the front surface portion 21 of the inner member 20 is being formed with two latching protruding portions 24 thereon. The two latching protruding portions 24 on the front surface portion 21 of the inner member 20 are constituted by respective head portions 24a, which are being configured to be inserted into the respective hole portions 135a of the two latching portions 135, respectively, in the first constituent holder case 10a of the holder case 10, and respective mating portions 24b, which are being formed at the bases of the respective head portions 24a in such a manner as to be narrower in width than the respective head portions 24a. As shown in FIG. 4B, the respective head portions 24a of the two latching protruding portions 24 on the front surface portion 21 of the inner member 20 are inserted into the respective hole portions 135a of the two latching portions 135, respectively, in the first constituent holder case 10a of the holder case 10, while the respective mating portions 24b of the two latching protruding portions 24 on the front surface portion 21 of the inner member 20 are moved downward in a state of being mated to the respective elongated hole portions 135b of the two latching portions 135, respectively, in the first constituent holder case 10a of the holder case 10, to thereby fix the inner member 20 to the first constituent holder case 10a of the holder case 10. Since the latched state of the two latching protruding portions 24 on the front surface portion 21 of the inner member 20 and the two latching portions 135 in the first constituent holder case 10a of the holder case 10 can be released by reversing the above operation, the inner member 20 can easily be attached to or detached from the holder case 10.

Likewise, as shown in FIGS. 5B and 5C, an upper portion of the back surface portion 22 of the inner member 20 is being formed with two latching protruding portions 25 thereon. The two latching protruding portions 25 on the back surface portion 22 of the inner member 20 are constituted by respective head portions 25a, which are being configured to be inserted into the respective hole portions 136a of the two latching portions 136, respectively, in the second constituent holder case 10b of the holder case 10, and respective mating portions 25b, which are being formed at the bases of the respective head portions 25a in such a manner as to be narrower in width than the respective head portions 25a. As shown in FIG. 4B, the respective head portions 25a of the two latching protruding portions 25 on the back surface portion 22 of the inner member 20 are inserted into the respective hole portions 136a of the two latching portions 136, respectively, in the second constituent holder case 10b of the holder case 10, while the respective mating portions 25b of the two latching protruding portions 25 on the back surface portion 22 of the inner member 20 are moved downward in a state of being mated to the respective elongated hole portions 135b of the two latching portions 136, respectively, in the second constituent holder case 10b of the holder case 10, to thereby fix the inner member 20 to the second constituent holder case 10b of the holder case 10. Since the latched state of the two latching protruding portions 25 on the back surface portion 22 of the inner member 20 and the two latching portions 136 in the second constituent holder case 10b of the holder case 10 can be released by reversing the above operation, the inner member 20 can easily be attached to or detached from the holder case 10.

As described above, since the wireless power transfer holder 1 according to the present embodiment is being configured in such a manner that the inner member 20 is attachable to and detachable from the receiving space 17 in the holder case 10, even when an object is dropped into the holder case 10, the dropped object can easily be taken out by detaching the inner member 20 from the holder case 10.

As shown in FIGS. 5A, 5B, and 5C, the inner member 20 is being configured in such a manner as to include a protruding portion 26 in the front surface portion 21 of the inner member 20, which is being configured in such a manner as to be protruded to an inductive power transferring device 50 side (a back surface portion 22 side of the inner member 20), and which is to be brought into contact with the electronic device 200 and thereby press the electronic device 200 toward the inductive power transferring device 50 side. The protruding portion 26 in the front surface portion 21 of the inner member 20 is being configured in a mound shape, for example, and in the shape of being able to be brought into contact with the electronic device 200, and is being protruded toward the inductive power transferring device 50 side (the back surface portion 22 side of the inner member 20). The protruding portion 26 is being configured in such a manner that the protruding height H of the protruding portion 26 protruded toward the inductive power transferring device 50 side is equal to or less than inclined portions of the first constituent supporting member 31 and the second constituent supporting member 41 of the supporting mechanism 30, which will be described later. Details of this will be described in the description of the supporting mechanism 30, which will be described later.

As shown in FIG. 5B, when the electronic device 200 is thin in the opposite thickness directions T of the electronic device 200, the electronic device 200 is acted on by pressing forces toward the inductive power transferring device 50 side, which are exerted by the inclined portions of the first constituent supporting member 31 and the second constituent supporting member 41 of the supporting mechanism 30, which will be described later. That is, the electronic device 200 is held in a state of being pushed toward the inductive power transferring device 50 side in the opposite thickness directions T of the electronic device 200 by the supporting mechanism 30 not shown in FIG. 5B. Therefore, the protruding portion 26 of the inner member 20 is substantially not deformed.

On the other hand, as shown in FIG. 5C, when the electronic device 200 is thick in the opposite thickness directions T of the electronic device 200, the electronic device 200 is acted on by a pressing force toward the inductive power transferring device 50 side, which is exerted by the protruding portion 26 of the inner member 20. That is, as shown in FIG. 5C, the electronic device 200 is held in a state of being pushed toward the inductive power transferring device 50 side in the opposite thickness directions T of the electronic device 200 by an elastic force resulting from the protruding portion 26 of the inner member 20 being brought into contact with the electronic device 200 and being deformed.

The bottom portion 23 of the inner member 20 is being formed in such a manner as to be inclined toward the inductive power transferring device 50 side. The inclined bottom portion 23 of the inner member 20 exerts an action of moving the electronic device 200 toward the inductive power transferring device 50 side. This makes it possible to more securely carry out the inductive power transfer to the electronic device 200 and the charging of the electronic device 200 with the inductive power transferring device 50.

Figure 6A:
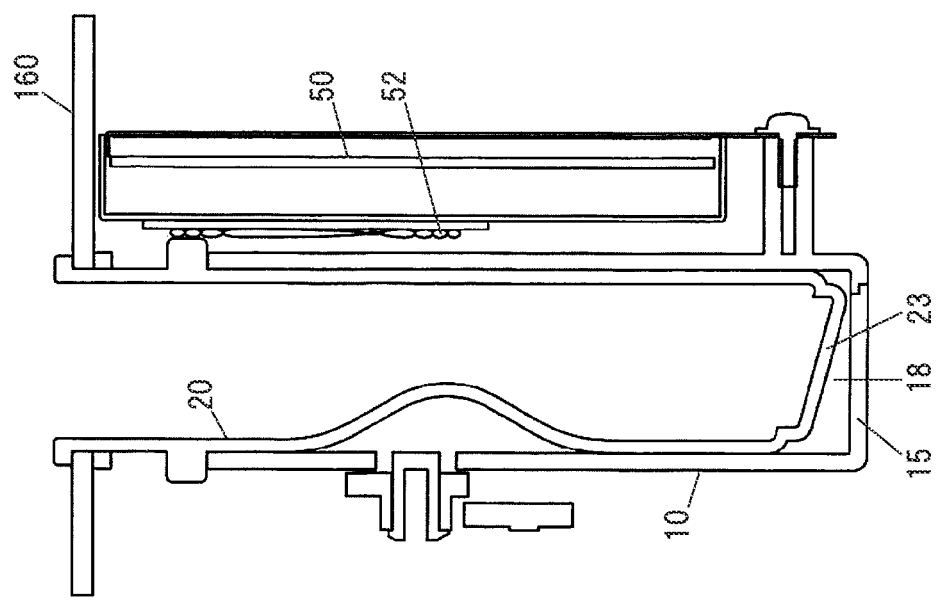
FIG. 6A is a cross-sectional view taken along a line C-C in FIG. 4B showing the wireless power transfer holder.
Figure 6B:
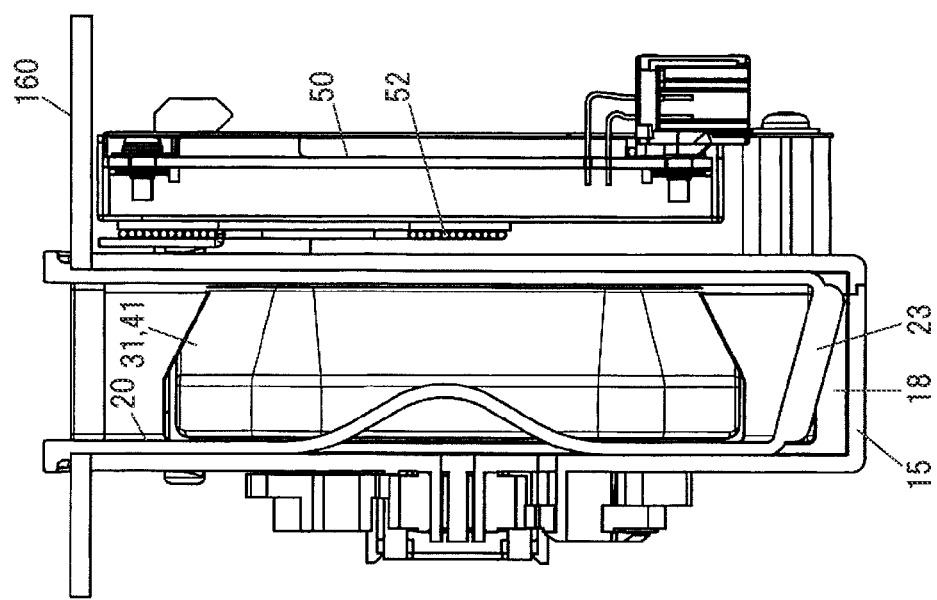
FIG. 6B is a cross-sectional view in which a supporting mechanism is being omitted in FIG. 6A so that the shape of the inner member can be well understood.

It should be noted that, as shown in FIGS. 6A and 6B, a gapped portion 18 is being provided between the bottom portion 15 of the holder case 10 and the inclined bottom portion 23 of the inner member 20. As a result, even when the protruding portion 26 of the inner member 20 is deformed and the bottom portion 23 of the inner member 20 is moved downward to cause a surplus length due to the deformation of the inner member 20, the gapped portion 18 between the bottom portion 15 of the holder case 10 and the inclined bottom portion 23 of the inner member 20 facilitates the absorption of that surplus length.

(Modifications)

Further, as shown in FIG. 5D, in the front surface portion 21 of the inner member 20, a width dimension w2 of the protruding portion 26 in the front surface portion 21 of the inner member 20 can be made smaller than a width dimension w1 of the front surface portion 21. As a result, the protruding portion 26 in the front surface portion 21 of the inner member 20 can be made softer. Further, this makes it possible to prevent the first constituent supporting member 31 and the second constituent supporting member 41 of the supporting mechanism 30, which will be described later, from causing interference when moved forward or backward. Further, the air flow can be improved to alleviate the temperature rise of the electronic device 200.

(Supporting Mechanism 30)

In the first embodiment, the supporting mechanism 30 is being provided on the other second lateral walling portion 13 of the second opposite lateral walling portions 13 and 14 of the holder case 10 being not mounted with the inductive power transferring device 50, and the first opposite lateral walling portions 11 and 12 of the holder case 10 includes respective open portions 11a and 12a thereon, so that when the electronic device 200 is being inserted and received in the holder case 10, the first constituent supporting member 31 and the second constituent supporting member 41 of the supporting mechanism 30 are exerting the bias forces on the opposite side surfaces 210 and 220, respectively, of the electronic device 200 through the respective first open portions 11a and 12a of the first opposite lateral walling portions 11 and 12, respectively, of the holder case 10. As a result, the bias forces can be exerted in such a manner as to hold the electronic device 200 in a predetermined position substantially coincided with the central axis CL of the holder case 10 in the opposite width directions W of the electronic device 200 shown in FIG. 1.

As shown in FIGS. 3 and 4B, the first constituent supporting member 31 of the supporting mechanism 30 is being configured in such a manner as to include a first supporting portion 32, which is being configured to be moved forward or backward relative to the electronic device 200, and be brought into contact and abutment with the side surface 210 of the electronic device 200, and a first arm portion 33, which is being configured to be coupled to the first supporting portion 32, and be slidably supported on the holder case 10.

Figure 8:
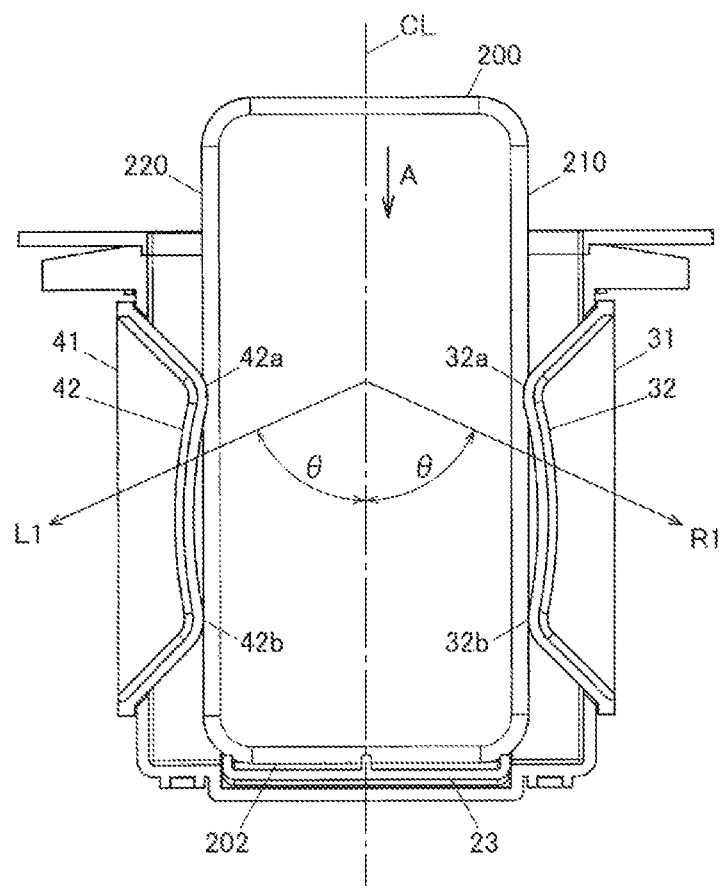
FIG. 8 is a cross-sectional view taken along a line D-D in FIG. 4A in which an electronic device is being held by the supporting members.

As shown in FIGS. 3 and 8, the first supporting portion 32 constituting the first constituent supporting member 31 of the supporting mechanism 30 is being formed with two abutting portions 32a and 32b on a side thereof to be provided opposite to the electronic device 200. The abutting portions 32a and 32b on the first supporting portion 32 are being formed in a protruding shape toward the side of the first supporting portion 32 to be provided opposite to the electronic device 200, and when holding the electronic device 200, the abutting portions 32a and 32b are brought into contact and abutment with the electronic device 200 substantially at the same time. It should be noted that the abutting portions 32a and 32b are preferably being formed as curved surfaces such as rounded surfaces or the like.

Figure 4A:
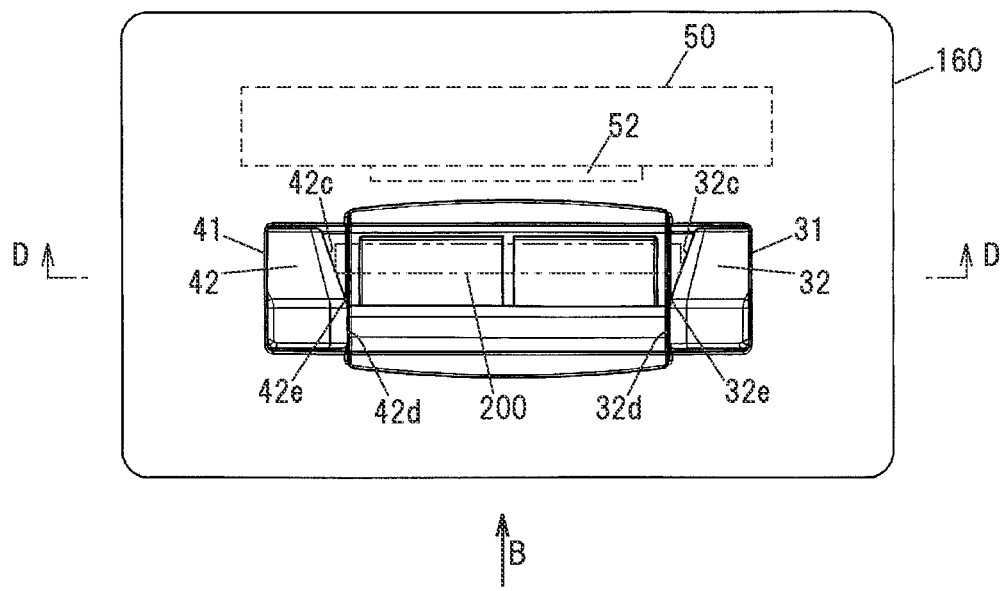
FIG. 4A is a top plan view showing the wireless power transfer holder when viewed from above.
Figure 4B:
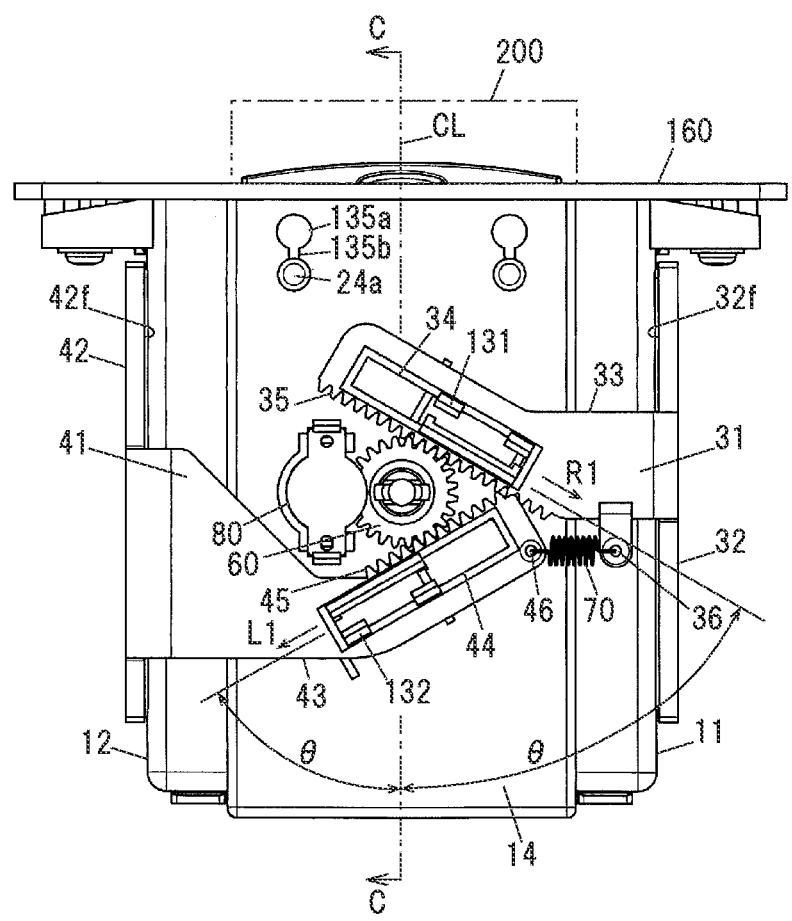
FIG. 4B is a front view showing the wireless power transfer holder viewed from a B direction shown in FIG. 4A.

As shown in FIG. 4A, the first supporting portion 32 constituting the first constituent supporting member 31 of the supporting mechanism 30 is being configured in such a manner as to include an inclined portion 32c and a flat portion 32d thereon, and the abutting portions 32a and 32b are being formed on the inclined portion 32c and the flat portion 32d of the first supporting portion 32. The inclined portion 32c of the first supporting portion 32 is being formed on a side close to the inductive power transferring device 50, while the flat portion 32d of the first supporting portion 32 is being formed on a side away from the inductive power transferring device 50 in such a manner that the end portions of the inclined portion 32c and the flat portion 32d of the first supporting portion 32 are continuous with each other.

Figure 7A:
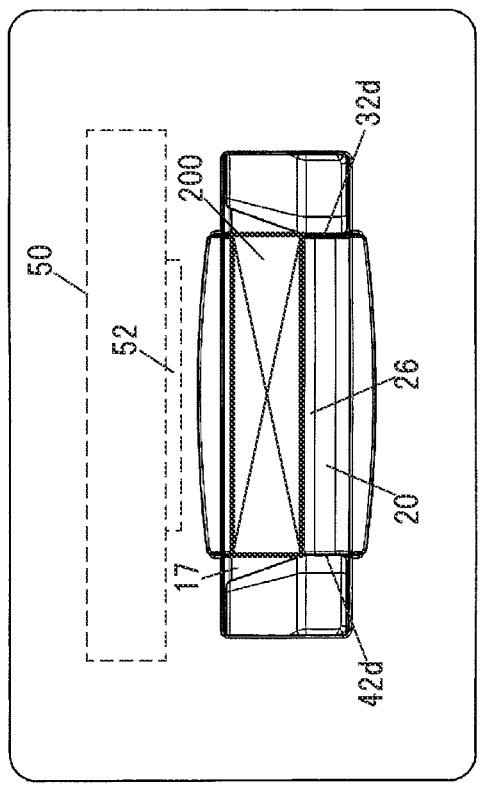
FIG. 7A is a diagram corresponding to FIG. 4A showing a case in which an electronic device thin in the opposite thickness directions of the electronic device is being held by supporting members.

As shown in FIG. 7A, when the electronic device 200 is thin in the opposite thickness directions T of the electronic device 200, the side surface 210 of the electronic device 200 is brought into contact and abutment with the inclined portion 32c of the first supporting portion 32 constituting the first constituent supporting member 31 of the supporting mechanism 30. As a result, the electronic device 200 receives a force component in the direction of the electronic device 200 of the bias force from the first supporting portion 32 constituting the first constituent supporting member 31 of the supporting mechanism 30, thereby being acted on by a pressing force toward the inductive power transferring device 50 side.

Here, the protruding height H of the protruding portion 26 of the inner member 20 toward the inductive power transferring device 50 side shown in FIG. 5B is equal to or less than the inclined portion 32c of the first supporting portion 32 constituting the first constituent supporting member 31 of the supporting mechanism 30. This protruding height H is determined by the positional relationship between a tip portion 26a of the protruding portion 26 of the inner member 20 and a boundary portion 32e between the inclined portion 32c and the flat portion 32d of the first supporting portion 32 constituting the first constituent supporting member 31 of the supporting mechanism 30. That is, the protruding height H of the protruding portion 26 of the inner member 20 being equal to or less than the inclined portion 32c refers to the tip portion 26a of the protruding portion 26 of the inner member 20 reaching the boundary portion 32e between the inclined portion 32c and the flat portion 32d of the first supporting portion 32 or not reaching the boundary portion 32e between the inclined portion 32c and the flat portion 32d of the first supporting portion 32. As a result, as shown in FIGS. 5B and 7A, when the electronic device 200 is thin in the opposite thickness directions T of the electronic device 200, the electronic device 200 is not acted on by the pressing force toward the inductive power transferring device 50 side from the protruding portion 26 of the inner member 20, but is acted on by the pressing force toward the inductive power transferring device 50 side from the inclined portion 32c of the first supporting portion 32 constituting the first constituent supporting member 31 of the supporting mechanism 30.

Figure 7B:
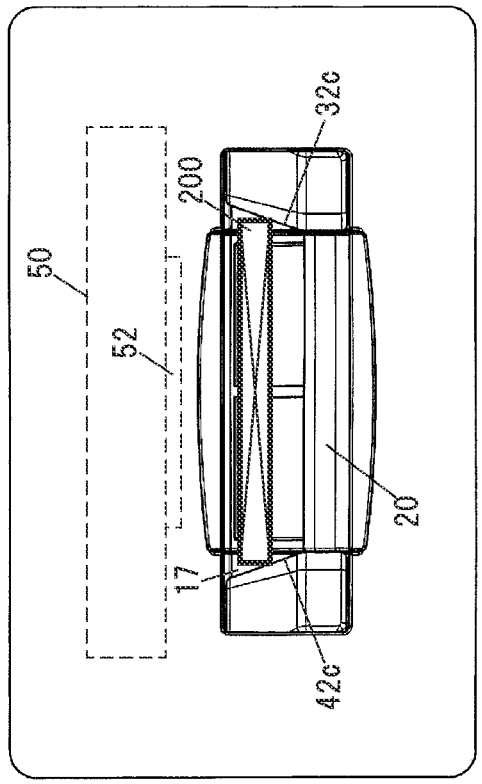
FIG. 7B is a diagram corresponding to FIG. 4A showing a case in which an electronic device thick in the opposite thickness directions of the electronic device is being held by the supporting members.

On the other hand, as shown in FIG. 7B, when the electronic device 200 is thick in the opposite thickness directions T of the electronic device 200, the side surface 210 of the electronic device 200 is brought into contact and abutment with the flat portion 32d of the first supporting portion 32 constituting the first constituent supporting member 31 of the supporting mechanism 30. Therefore, as shown in FIGS. 5C and 7B, the electronic device 200 is acted on by the pressing force toward the inductive power transferring device 50 side from the protruding portion 26 of the inner member 20.

As shown in FIG. 4B, the first arm portion 33 constituting the first constituent supporting member 31 of the supporting mechanism 30 is being configured in such a manner as to include an elongated hole portion 34, which is being configured in such a manner as to be movably (slidably) supported on the first supporting member supporting portion 131 of the first constituent holder case 10a of the holder case 10. The movable distance of the first constituent supporting member 31 of the supporting mechanism 30 is defined by the movable distance between the first supporting member supporting portion 131 of the first constituent holder case 10a of the holder case 10 and the elongated hole portion 34 on the first arm portion 33 constituting the first constituent supporting member 31 of the supporting mechanism 30. It should be noted that, as shown in FIG. 4B, a state in which an end face 32f of the first supporting portion 32 constituting the first constituent supporting member 31 of the supporting mechanism 30 is being brought into abutment with the first lateral walling portion 11 of the first constituent holder case 10a of the holder case 10 can be taken as an initial position in which the electronic device 200 is not being inserted. As a result, the open portion 11a of the first lateral walling portion 11 of the first constituent holder case 10a of the holder case 10 is closed, and the occurrence of ingress of dust and the like into the holder case 10 can therefore be suppressed.

A forming direction for the elongated hole portion 34 on the first arm portion 33 constituting the first constituent supporting member 31 of the supporting mechanism 30 is being configured in such a manner that when the first constituent supporting member 31 of the supporting mechanism 30 is being assembled to the first constituent holder case 10a of the holder case 10, the moving direction (the sliding direction) of the first constituent supporting member 31 (the first arm portion 33) of the supporting mechanism 30 is the tilt angle θ for the first supporting member supporting portion 131 shown in FIG. 3 on the second lateral walling portion 13 of the first constituent holder case 10a of the holder case 10.

The first arm portion 33 constituting the first constituent supporting member 31 of the supporting mechanism 30 is being formed with a rack geared portion 35 thereon. The rack geared portion 35 on the first arm portion 33 is being formed in parallel with the elongated hole portion 34 on the first arm portion 33, and is meshed to the pinion gear 60 on the second lateral walling portion 13 of the first constituent holder case 10a of the holder case 10.

As shown in FIGS. 3 and 4B, the second constituent supporting member 41 of the supporting mechanism 30 is being formed relative to the first constituent supporting member 31 of the supporting mechanism 30 symmetrically with respect to the central axis CL of the holder case 10. As with the first constituent supporting member 31 of the supporting mechanism 30, the second constituent supporting member 41 of the supporting mechanism 30 is being configured in such a manner as to include a second supporting portion 42, and a second arm portion 43.

As with the first supporting portion 32 constituting the first constituent supporting member 31 of the supporting mechanism 30, the second supporting portion 42 constituting the second constituent supporting member 41 of the supporting mechanism 30 is being formed in such a manner as to include two abutting portions 42a and 42b, an inclined portion 42c, and a flat portion 42d thereon. Further, the second arm portion 43 constituting the second constituent supporting member 41 of the supporting mechanism 30 is also being formed with an elongated hole portion 44 and a rack geared portion 45 thereon.

As shown in FIG. 4B, the first constituent supporting member 31 and the second constituent supporting member 41 of the supporting mechanism 30 are being arranged symmetrically with respect to the central axis CL of the holder case 10. The rack geared portion 35 on the first arm portion 33 constituting the first constituent supporting member 31 of the supporting mechanism 30 and the rack geared portion 45 on the second arm portion 43 constituting the second constituent supporting member 41 of the supporting mechanism 30 are both being meshed to the pinion gear 60 on the second lateral walling portion 13 of the first constituent holder case 10a of the holder case 10. This renders the first constituent supporting member 31 and the second constituent supporting member 41 of the supporting mechanism 30 movable in a synchronous and symmetrical manner with respect to the central axis CL of the holder case 10.

Both ends of a coil spring 70, which is being used as an elastic member to produce bias forces, are being latched between a spring latching portion 36, which is being provided for the first constituent supporting member 31 of the supporting mechanism 30, and a spring latching portion 46, which is being provided for the second constituent supporting member 41 of the supporting mechanism 30. In the initial state in which the electronic device 200 is not being inserted as shown in FIG. 4B, the coil spring 70 is being placed in a stretched state. This makes it possible for the first constituent supporting member 31 and the second constituent supporting member 41 of the supporting mechanism 30 to always transmit their respective bias forces being produced by the coil spring 70 to the electronic device 200 while the electronic device 200 is being inserted or is being held in the holder case 10.

The above bias forces act in the directions of the tilt angles θ set symmetrically in right and left, respectively, with respect to the central axis CL of the holder case 10, shown in FIG. 4B. That is, as shown in FIG. 8, the electronic device 200 is inserted in an A direction and, as a result, the electronic device 200 pushes the first constituent supporting member 31 and the second constituent supporting member 41 of the supporting mechanism 30 in an R1 direction and an L1 direction, respectively, and as reaction forces thereto, the bias forces by the first constituent supporting member 31 and the second constituent supporting member 41 of the supporting mechanism 30 are exerted on the electronic device 200 in the opposite directions to the R1 direction and the L1 direction, respectively. This allows the electronic device 200 to be held in the right and left directions in FIG. 4B (the opposite width directions W shown in FIG. 1) in the holder case 10.

As shown in FIGS. 1 and 4B, the damper member 80 can be fitted to the holder case 10 in such a manner that the meshing gear 81 on the damper member 80 is meshed to the pinion gear 60 on the second lateral walling portion 13 of the first constituent holder case 10*a* of the holder case 10. This makes it possible to transmit a braking force by the damper member 80 to the first constituent supporting member 31 and the second constituent supporting member 41 of the supporting mechanism 30 through the pinion gear 60 and the rack geared portions 35 and 45. That is, it is possible to make smooth the forward or backward movement of the first constituent supporting member 31 and the second constituent supporting member 41 of the supporting mechanism 30 during the forward or backward movement, and thereby improve the insertion operability of the electronic device 200 during the insertion of the electronic device 200.

Since the supporting mechanism 30 (the first constituent supporting member 31 and the second constituent supporting member 41 of the supporting mechanism 30) provides the hard type supporting as described previously, the first constituent supporting member 31 and the second constituent supporting member 41 of the supporting mechanism 30 are being formed of a hard member having a rigidity whose extent allows it not to be elastically deformed in a state of being held, such as a hard resin, a metal, or the like. In the present embodiment, the first constituent supporting member 31 and the second constituent supporting member 41 of the supporting mechanism 30 are being formed of a hard resin.

(Inductive Power Transferring Device 50)

As shown in FIG. 3, the inductive power transferring device 50 is constituted schematically by an inductive power transmitting coil 52, which is arranged in contact with or in adjacence to the back surface 14*b* of the second lateral walling portion 14 of the second constituent holder case 10*b* of the holder case 10, and an inductive power transmitting circuit (not shown), which is being mounted within a main body case 51, and the like, and the main body case 51 is fitted and fixed to the second constituent holder case 10*b* of the holder case 10.

As shown in FIG. 4A, the inductive power transmitting coil 52 for the inductive power transferring device 50 is being configured to carry out the inductive power transfer to the electronic device 200 and the charging of the electronic device 200, in a state of being electromagnetically coupled to an inductive power receiving coil (not shown) mounted in the interior of the electronic device 200 received in the holder case 10. Energizing the inductive power transmitting coil 52 constituting the inductive power transferring device 50 allows electromagnetic induction to inductively transfer an electric power in a non-contact manner through the inductive power receiving coil of the electronic device 200 to the electronic device 200 and thereby charge the electronic device 200. It should be noted that, for example, when the power transferring device 50 is placed in a state of being able to carry out the inductive power transfer and charging in a vehicle operating mode or a vehicle ACC mode, the power transferring device 50 is able to carry out the inductive power transfer and charging by only inserting and setting the electronic device 200 in the wireless power transfer holder 1.

(The Operation of the Wireless Power Transfer Holder 1, and the Insertion and Holding of the Electronic Device 200)

As shown in FIG. 1, the electronic device 200 is to be inserted from above through the open portion 16 of the holder case 10 into the receiving space 17 in the holder case 10.

As shown in FIG. 8, the opposite side surfaces 210 and 220 of the electronic device 200 are brought into contact and abutment with the abutting portions 32*a* and 32*b*, respectively, of the first supporting portion 32 constituting the first constituent supporting member 31 of the supporting mechanism 30, and the abutting portions 42*a* and 42*b*, respectively, of the second supporting portion 42 constituting the second constituent supporting member 41 of the supporting mechanism 30. That is, the opposite side surfaces 210 and 220 of the electronic device 200 are held in respective two upper and lower places. Further, the electronic device 200 can be inserted until a lower end portion 202 of the electronic device 200 reaches the bottom portion 23 of the inner member 20. This allows the electronic device 200 to be stably held in the receiving space 17 in the holder case 10 in a state of being brought into contact with a side of the bottom portion 23 of the inner member 20.

As shown in FIG. 8, in the insertion operation for the electronic device 200, the electronic device 200 is inserted with the electronic device 200 pushing the first constituent supporting member 31 and the second constituent supporting member 41 of the supporting mechanism 30 in the directions of the tilt angles θ set symmetrically in right and left, respectively, with respect to the central axis CL of the holder case 10. Since the respective tilt angles θ of the first constituent supporting member 31 and the second constituent supporting member 41 of the supporting mechanism 30 are being set at an acute angle of less than 90 degrees, the electronic device 200 is inserted with the electronic device 200 pushing the first constituent supporting member 31 and the second constituent supporting member 41 of the supporting mechanism 30 in the symmetrical diagonal downward directions, respectively, with respect to the central axis CL of the holder case 10, thus the electronic device 200 can be inserted more smoothly than when the electronic device 200 is inserted with the electronic device 200 pushing and spreading out the first constituent supporting member 31 and the second constituent supporting member 41 of the supporting mechanism 30 directly toward the right and left lateral sides, respectively.

Since the first constituent supporting member 31 and the second constituent supporting member 41 of the supporting mechanism 30 are being arranged symmetrically in right and left, respectively, with respect to the central axis CL of the holder case 10, the electronic device 200 is aligned with the central axis CL of the holder case 10, and is held in a middle portion in the right and left directions of the holder case 10.

As shown in FIGS. 5B and 7A, when the electronic device 200 is thin in the opposite thickness directions T of the electronic device 200, the side surface 210 of the electronic device 200 is brought into contact and abutment with the inclined portion 32c of the first supporting portion 32 constituting the first constituent supporting member 31 of the supporting mechanism 30. As a result, the electronic device 200 receives the force component in the direction of the electronic device 200 of the bias force from the first supporting portion 32 constituting the first constituent supporting member 31 of the supporting mechanism 30, thereby being acted on by a pressing force toward the inductive power transferring device 50 side. The inclined portion 42c of the second supporting portion 42 constituting the second constituent supporting member 41 of the supporting mechanism 30 and the side surface 220 of the electronic device 200 are also brought into contact and abutment with each other in the same manner. As a result, as shown in FIGS. 5B and 7A, the electronic device 200 is held in the inner member 20 or in the receiving space 17 in the holder case 10 in a state of being brought close to the inductive power transferring device 50 side.

As shown in FIGS. 5C and 7B, when the electronic device 200 is thick in the opposite thickness directions T of the electronic device 200, the side surface 210 of the electronic device 200 is brought into contact and abutment with the flat portion 32d of the first supporting portion 32 constituting the first constituent supporting member 31 of the supporting mechanism 30. The flat portion 42d of the second supporting portion 42 constituting the second constituent supporting member 41 of the supporting mechanism 30 and the side surface 220 of the electronic device 200 are also brought into contact and abutment with each other in the same manner. Therefore, as shown in FIGS. 5C and 7B, the electronic device 200 is acted on by the pressing force toward the inductive power transferring device 50 side from the protruding portion 26 of the inner member 20. As a result, as shown in FIGS. 5C and 7B, the electronic device 200 is held in the inner member 20 or in the receiving space 17 in the holder case 10 in a state of being brought close to the inductive power transferring device 50 side.

(Inductive Power Transfer to the Electronic Device 200, and the Charging Operation)

The electronic device 200 is received in the receiving space 17 in the holder case 10, and is held in a state of being brought close to the right to left middle portion of the holder case 10 and the inductive power transferring device 50 side. In this held state of the electronic device 200, the inductive power transmitting coil 52 on the inductive power transferring device 50 is energized to allow the electromagnetic induction to inductively transfer an electric power in a non-contact manner through the inductive power receiving coil of the electronic device 200 to the electronic device 200 and thereby charge the electronic device 200.

As shown in FIG. 2, when the wireless power transfer holder 1 is being mounted on a vehicle 100 for example, placing the power transferring device 50 in a state of being able to carry out the inductive power transfer and charging in a vehicle operating mode or a vehicle ACC mode allows the power transferring device 50 to carry out the inductive power transfer and charging by only inserting and setting the electronic device 200 in the wireless power transfer holder 1.

(Advantageous Effects of the Wireless Power Transfer Holder 1 According to the First Embodiment)

The wireless power transfer holder 1 according to the present embodiment described above has advantageous effects as described below.

(1) The wireless power transfer holder 1 according to the embodiment of the present invention is being configured in such a manner as to include the supporting mechanism 30 including the first constituent supporting member 31 and the second constituent supporting member 41, which are being configured in such a manner as to be movable in a synchronous and symmetrical manner with respect to the central axis CL of the holder case 10. Further, the electronic device 200 is inserted with the electronic device 200 pushing the first constituent supporting member 31 and the second constituent supporting member 41 of the supporting mechanism 30 in the symmetrical diagonal downward directions, respectively, with respect to the central axis CL of the holder case 10. As a result, the insertability of the electronic device 200 is enhanced. Further, after the insertion of the electronic device 200, the first constituent supporting member 31 and the second constituent supporting member 41 of the supporting mechanism 30 are moved to upper portions to hold the center of gravity of the electronic device 200 in place and thereby render the holding of the electronic device 200 stable.

(2) Since the first constituent supporting member 31 and the second constituent supporting member 41 of the supporting mechanism 30 are movable in a synchronous and symmetrical manner with respect to the central axis CL of the holder case 10, the electronic device 200 is prevented from leaning to one side in the right and left directions (the lateral directions) of the electronic device 200, and the electronic device 200 is therefore securely positionally aligned with the inductive power transmitting coil 52 on the inductive power transferring device 50.

(3) The side surfaces 210 and 220 of the electronic device 200 are brought into contact and abutment with the abutting portions 32a and 32b, respectively, of the first supporting portion 32 constituting the first constituent supporting member 31 of the supporting mechanism 30, and the abutting portions 42a and 42b, respectively, of the second supporting portion 42 constituting the second constituent supporting member 41 of the supporting mechanism 30, and the opposite side surfaces 210 and 220 of the electronic device 200 are held in respective two upper and lower places. The lower end portion 202 of the electronic device 200 reaches the bottom portion 23 of the inner member 20. Therefore, the posture of the held electronic device 200 becomes stable.

(4) By mounting one damper member 80, that is meshed to the pinion gear 60, on the portion of the holder case 10 on which the first constituent supporting member 31 and the second constituent supporting member 41 of the supporting mechanism 30 are not provided, it is possible to make smooth the forward or backward movement of the first constituent supporting member 31 and the second constituent supporting member 41 of the supporting mechanism 30 during the forward or backward movement, and thereby improve the insertion operability of the electronic device 200 during the insertion of the electronic device 200.

(Second Embodiment)

Figure 9:
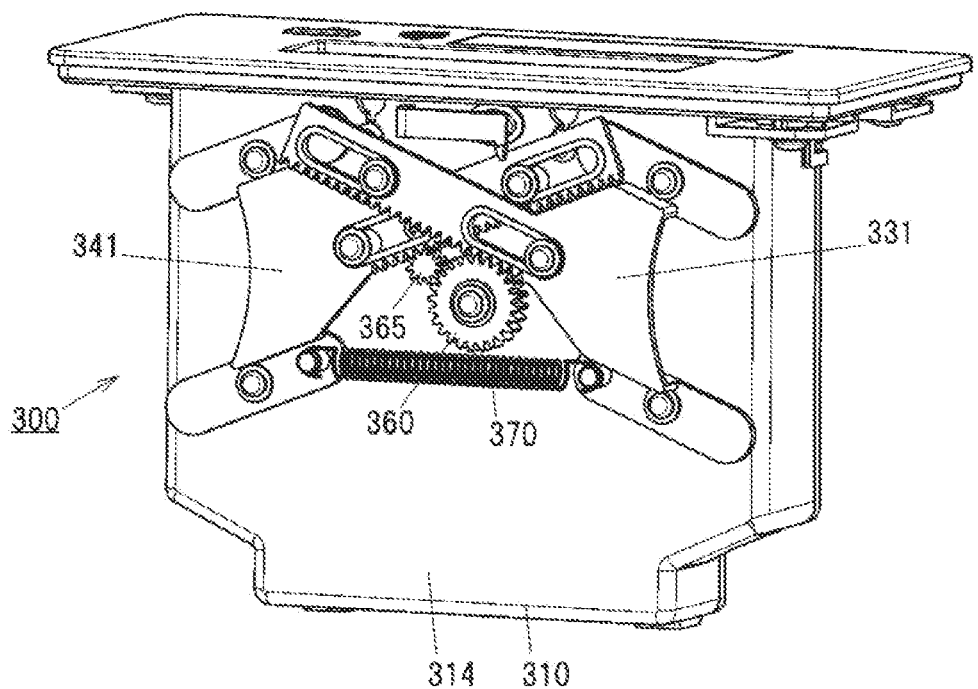
FIG. 9 is a stereographic perspective view showing an overall configuration of a wireless power transfer holder according to a second embodiment of the present invention.
Figure 10A:
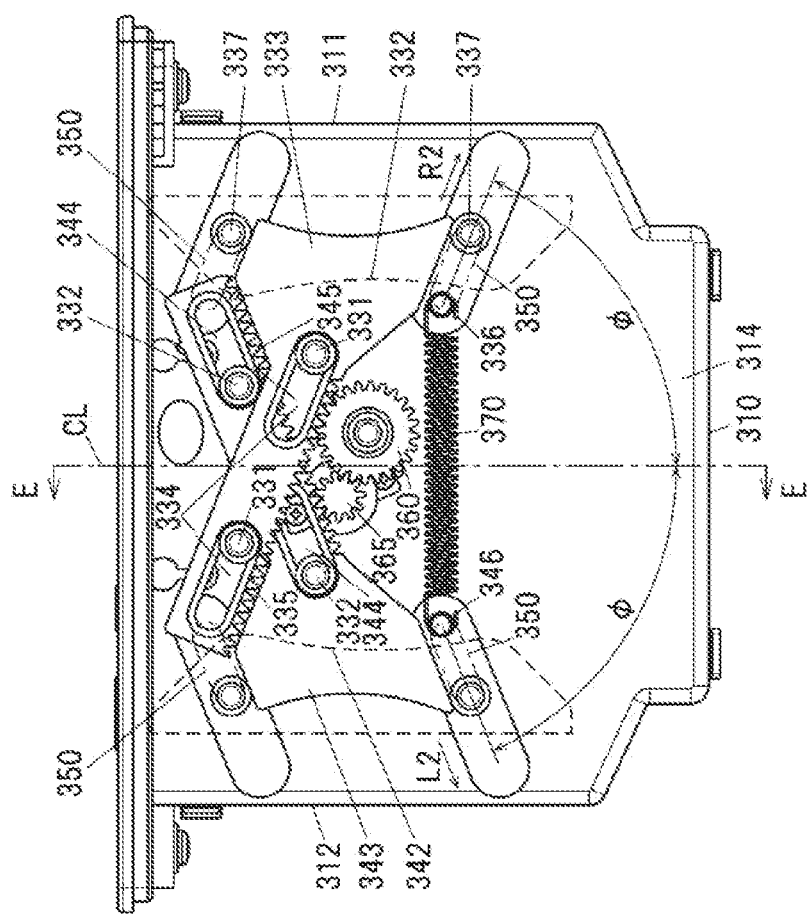
FIG. 10A is a front view showing the wireless power transfer holder according to the second embodiment of the present invention.
Figure 10B:
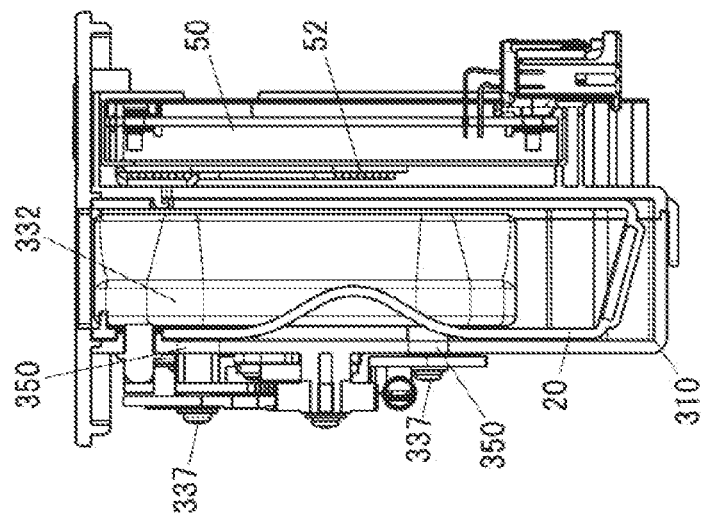
FIG. 10B is a cross-sectional view taken along a line E-E shown in FIG. 10A showing the wireless power transfer holder according to the second embodiment of the present invention.

As shown in FIGS. 9, 10A and 10B, a supporting mechanism 300 according to a second embodiment is being provided on a lateral walling portion 314 of a holder case 310 on which the inductive power transferring device 50 is not being mounted, and the lateral walling portion 314 of the holder case 310 includes four second open portions 350 therein, while the supporting mechanism 300 includes a first constituent supporting member 331 and a second constituent supporting member 341, which are being configured in such a manner as to exert bias forces on the opposite side surfaces 210 and 220, respectively, of the electronic device 200 through the four second open portions 350. As a result, the bias forces can be exerted in such a manner as to hold the electronic device 200 in a predetermined position substantially coincided with the central axis CL of the holder case 10 in the opposite width directions W of the electronic device 200 shown in FIG. 1.

As shown in FIG. 10B, a first supporting portion 332, which constitutes the first constituent supporting member 331 of the supporting mechanism 300, is being connected by two connecting members 337 to a first arm portion 333, which constitutes the first constituent supporting member 331 of the supporting mechanism 300. Likewise, a second supporting portion 342, which constitutes the second constituent supporting member 341 of the supporting mechanism 300, is being connected by two connecting members 337 to a second arm portion 343, which constitutes the second constituent supporting member 341 of the supporting mechanism 300. The four connecting members 337 are passing through the four second open portions 350, respectively, in the lateral walling portion 314 of the holder case 310. As a result, the holder case 310 according to the second embodiment may be configured in such a manner as to include only the four second open portions 350 in the lateral walling portion 314 of the holder case 310 shown in FIG. 10A excluding the upper open portion, and is able to suppress the occurrence of ingress of dust and the like from the outside.

As shown in FIG. 10A, the first arm portion 333 constituting the first constituent supporting member 331 of the supporting mechanism 300 is being configured in such a manner as to include two elongated hole portions 334 therein, which are being configured in such a manner as to be movably (slidably) supported on the holder case 310 by two supporting portions, respectively. The first arm portion 333 constituting the first constituent supporting member 331 of the supporting mechanism 300 is being formed with a rack geared portion 335 thereon. The rack geared portion 335 on the first arm portion 333 is being formed in parallel with the two elongated hole portions 334 in the first arm portion 333, and is being meshed to a pinion gear 360.

In the second embodiment, the first supporting portion 332 constituting the first constituent supporting member 331 of the supporting mechanism 300 and the second supporting portion 342 constituting the second constituent supporting member 341 of the supporting mechanism 300 are being formed symmetrically in right and left with respect to the central axis CL of the holder case 310. The second supporting portion 342 constituting the second constituent supporting member 341 of the supporting mechanism 300 is being formed relative to the first supporting portion 332 constituting the first constituent supporting member 331 of the supporting mechanism 300, symmetrically in right and left with respect to the central axis CL of the holder case 310, and as with the first supporting portion 332 constituting the first constituent supporting member 331 of the supporting mechanism 300, the second supporting portion 342 constituting the second constituent supporting member 341 of the supporting mechanism 300 is being formed with the second arm portion 343, two elongated hole portions 344 in the second arm portion 343, which are being configured in such a manner as to be movably (slidably) supported on the holder case 310 by two supporting portions, respectively, and a rack geared portion 345 on the second arm portion 343.

As shown in FIG. 10A, the first constituent supporting member 331 and the second constituent supporting member 341 of the supporting mechanism 300 are being arranged symmetrically in right and left with respect to the central axis CL of the holder case 310. The rack geared portion 335 on the first arm portion 333 is being meshed to the pinion gear 360. Further, the rack geared portion 345 on the second arm portion 343 is being meshed to the pinion gear 360 through an intermediate gear 365. This renders the first constituent supporting member 331 and the second constituent supporting member 341 of the supporting mechanism 300 movable in a synchronous and symmetrical manner with respect to the central axis CL of the holder case 310.

Both ends of a coil spring 370, which is being used as an elastic member to produce bias forces, are being latched between a spring latching portion 336, which is being provided for the first constituent supporting member 331 of the supporting mechanism 300, and a spring latching portion 346, which is being provided for the second constituent supporting member 341 of the supporting mechanism 300. In the initial state in which the electronic device 200 is not being inserted as shown in FIG. 10A, the coil spring 370 is being placed in a stretched state. This makes it possible for the first constituent supporting member 331 and the second constituent supporting member 341 of the supporting mechanism 300 to always transmit their respective bias forces being produced by the coil spring 370 while the electronic device 200 is being inserted or is being held in the holder case 310.

The above bias forces act in the directions of the tilt angles φ set symmetrically in right and left, respectively, with respect to the central axis CL of the holder case 310, shown in FIG. 10A. That is, when the electronic device 200 is inserted downward and, as a result, the electronic device 200 pushes the first constituent supporting member 331 and the second constituent supporting member 341 of the supporting mechanism 300 in an R2 direction and an L2 direction, respectively, and as reaction forces thereto, the bias forces by the first constituent supporting member 331 and the second constituent supporting member 341 of the supporting mechanism 300 are exerted on the electronic device 200 in the opposite directions to the R2 direction and the L2 direction, respectively. This allows the electronic device 200 to be held in the opposite width directions W shown in FIG. 1 in the holder case 310.

The respective tilt angles φ of the first constituent supporting member 331 and the second constituent supporting member 341 of the supporting mechanism 300 are, for example, 60 degrees, and are being set at an acute angle of not larger than 90 degrees, in the same manner as in the first embodiment. As a result, the electronic device 200 is inserted with the electronic device 200 pushing the first constituent supporting member 331 and the second constituent supporting member 341 of the supporting mechanism 300 in the symmetrical diagonal downward directions, respectively, with respect to the central axis CL of the holder case 310, thus the electronic device 200 can be inserted more smoothly than when the electronic device 200 is inserted with the electronic device 200 pushing and spreading out the first constituent supporting member 331 and the second constituent supporting member 341 of the supporting mechanism 300 directly toward the right and left lateral sides, respectively.

(Advantageous Effects of the Wireless Power Transfer Holder 1 According to the Second Embodiment)

The wireless power transfer holder 1 according to the second embodiment has advantageous effects as described below in addition to the advantageous effects of the first embodiment.

(1) The first supporting portion 332 constituting the first constituent supporting member 331 of the supporting mechanism 300 and the second supporting portion 342 constituting the second constituent supporting member 341 of the supporting mechanism 300 are being formed symmetrically in right and left and are being arranged symmetrically in right and left with respect to the central axis CL of the holder case 310. This results in the supporting mechanism 300 having a better right-left balance as compared with the first embodiment.

(2) The first supporting portion 332 constituting the first constituent supporting member 331 of the supporting mechanism 300 is being connected to the first arm portion 333 through the two second open portions 350, while the second supporting portion 342 constituting the second constituent supporting member 341 of the supporting mechanism 300 is being connected to the second arm portion 343 through the two second open portions 350. Therefore, unlike the first embodiment, there is no need to provide large open portions, respectively, on the opposite lateral walling portions 311 and 312 of the holder case 310. This makes it possible to suppress the occurrence of ingress of dust and the like into the holder case 310.

Although the embodiments of the present invention have been described above, the present invention is not limited to the above described embodiments, but various modifications can be carried out without departing from the spirit of the invention. In addition, the above described embodiments are not to be construed as limiting the inventions according to the appended claims. In addition, it should be noted that not all the combinations of the features described in the embodiments are indispensable to the means for solving the problem of the invention.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

REFERENCE SIGNS LIST

1 WIRELESS POWER TRANSFER HOLDER
10 HOLDER CASE
10a FIRST HOLDER CASE
10b SECOND HOLDER CASE
11, 12 FIRST LATERAL WALLING PORTION
11a, 12a FIRST OPEN PORTION
13, 14 SECOND LATERAL WALLING PORTION
14a FRONT SURFACE
14b BACK SURFACE
14c ENGAGING PORTION
15 BOTTOM PORTION
16 OPEN PORTION
17 RECEIVING SPACE
18 GAPPED PORTION
20 INNER MEMBER
21 FRONT SURFACE PORTION
21a, 22a FLANGED PORTION
22 BACK SURFACE PORTION
23 BOTTOM PORTION
24 LATCHING PROTRUDING PORTION
24a HEAD PORTION
24b MATING PORTION
25 LATCHING PROTRUDING PORTION
25a HEAD PORTION
25b MATING PORTION
26 PROTRUDING PORTION
26a TIP PORTION
30 SUPPORTING MECHANISM
31 FIRST SUPPORTING MEMBER
32 FIRST SUPPORTING PORTION
32a, 32b ABUTTING PORTION
32c INCLINED PORTION
32d FLAT PORTION
32c BOUNDARY PORTION
32f END FACE
33 FIRST ARM PORTION
34 ELONGATED HOLE PORTION
35 RACK GEARED PORTION
36 SPRING LATCHING PORTION
41 SECOND SUPPORTING MEMBER
42 SECOND SUPPORTING PORTION
42a, 42b ABUTTING PORTION
42c INCLINED PORTION
42d FLAT PORTION
43 SECOND ARM PORTION
44 ELONGATED HOLE PORTION
45 RACK GEARED PORTION
46 SPRING LATCHING PORTION
50 INDUCTIVE POWER TRANSFERRING DEVICE
51 MAIN BODY CASE
52 INDUCTIVE POWER TRANSMITTING COIL
60 PINION GEAR
70 COIL SPRING
80 DAMPER MEMBER
81 MESHING GEAR
82 PORTION TO BE FITTED
100 VEHICLE
110 CENTER CONSOLE
131 SUPPORTING PORTION
131a SUPPORTING PIECE
132 SUPPORTING PORTION
132a SUPPORTING PIECE
133 PIVOTAL SHAFT
134 DAMPER FIXING PORTION
135 LATCHING PORTION
135a HOLE PORTION
135b ELONGATED HOLE PORTION
136 LATCHING PORTION
136a HOLE PORTION
136b ELONGATED HOLE PORTION
160 UPPER PANEL
200 ELECTRONIC DEVICE
201 UPPER PORTION
202 LOWER END PORTION
210 SIDE SURFACE
230 FRONT SURFACE
240 BACK SURFACE
300 SUPPORTING MECHANISM
331 FIRST SUPPORTING MEMBER
341 SECOND SUPPORTING MEMBER
410 HOLDER CASE
CL CENTRAL AXIS
T THICKNESS DIRECTIONS
W WIDTH DIRECTIONS
w1 WIDTH DIMENSION
w2 WIDTH DIMENSION
$\theta$, $\varphi$ TILT ANGLE

The invention claimed is:

1. A wireless power transfer holder, comprising:
a holder case including a receiving space formed by first opposite lateral walling portions, which are being configured to be provided opposite to opposite side surfaces, respectively, defining opposite width directions of an electronic device, second opposite lateral walling portions, which are being configured to be provided opposite to a front surface and a back surface, respectively, defining opposite thickness directions of the electronic device, a bottom portion, which is closing one end of a spatial portion formed by the first opposite lateral walling portions and the second opposite lateral walling portions, and an open portion, which is being formed opposite to the bottom portion, so that the electronic device is inserted and received through the open portion into the receiving space in the holder case;

a supporting mechanism including a first constituent supporting member and a second constituent supporting member, which are being configured in such a manner as to be movable symmetrically forward or backward in the opposite width directions of the electronic device from the first opposite lateral walling portions, respectively, of the holder case relative to the electronic device, the first constituent supporting member and the second constituent supporting member of the supporting mechanism exerting bias forces on the opposite side surfaces, respectively, of the electronic device; and an inductive power transferring device mounted on one of the second opposite lateral walling portions of the holder case to inductively transfer an electric power in a non-contact manner to the electronic device held in the receiving space in the holder case, wherein the first constituent supporting member and the second constituent supporting member are configured so as to be moved in diagonal downward directions, respectively, relative to the electronic device when the electronic device is being inserted and received in the receiving space in the holder case.

2. The wireless power transfer holder according to claim 1, wherein directions in which the first constituent supporting member and the second constituent supporting member, respectively, are being moved in the diagonal downward directions by being pushed by the electronic device make acute angles, respectively, with a direction in which the electronic device is being inserted.

3. The wireless power transfer holder according to claim 1, wherein the first constituent supporting member is to be brought into contact with two portions of one of the opposite side surfaces of the electronic device, while the second constituent supporting member is to be brought into contact with two portions of an other of the opposite side surfaces of the electronic device.

4. The wireless power transfer holder according to claim 1, wherein the holder case includes an inner member received in an attachable and detachable manner in the receiving space therein, so that when the electronic device is being inserted and received in the holder case, the inner member is able to hold the electronic device in the opposite thickness directions of the electronic device.

5. The wireless power transfer holder according to claim 1, wherein the supporting mechanism is being provided on an other of the second opposite lateral walling portions of the holder case being not mounted with the inductive power transferring device, and each of the first opposite lateral walling portions of the holder case includes a respective first open portion thereon, so that when the electronic device is being inserted and received in the holder case, the first constituent supporting member and the second constituent supporting member of the supporting mechanism are exerting the bias forces on the opposite side surfaces, respectively, of the electronic device through the respective first open portions of the first opposite lateral walling portions, respectively, of the holder case.

6. The wireless power transfer holder according to claim 1, wherein the supporting mechanism is being provided on an other of the second opposite lateral walling portions of the holder case being not mounted with the inductive power transferring device, and the other of the second opposite lateral walling portions of the holder case includes four second open portions therein, so that when the electronic device is being inserted and received in the holder case, the first constituent supporting member and the second constituent supporting member of the supporting mechanism are exerting the bias forces on the opposite side surfaces, respectively, of the electronic device through respective two of the four second open portions in the other of the second opposite lateral walling portions of the holder case.

7. The wireless power transfer holder according to claim 1, wherein the supporting mechanism is being provided on an other of the second opposite lateral walling portions of the holder case being not mounted with the inductive power transferring device, with a pinion gear being supported in a pivotal manner on the other of the second opposite lateral walling portions of the holder case, and the first constituent supporting member of the supporting mechanism includes a first rack geared portion thereon, while the second constituent supporting member of the supporting mechanism includes a second rack geared portion thereon, with the first rack geared portion of the first constituent supporting member and the second rack geared portion of the second constituent supporting member being meshed to the pinion gear in such a manner that the first rack geared portion of the first constituent supporting member and the second rack geared portion of the second constituent supporting member face each other, so that the first constituent supporting member and the second constituent supporting member of the supporting mechanism are able to be moved in a symmetrical and synchronous manner in the opposite width directions, respectively, of the electronic device.

8. The wireless power transfer holder according to claim 1, wherein the electronic device is to be held in the receiving space in the holder case in such a manner as to remain in contact with a side of the bottom portion of the holder case.

9. The wireless power transfer holder according to claim 1, wherein the supporting mechanism is being provided on an other of the second opposite lateral walling portions of the holder case being not mounted with the inductive power transferring device, with a pinion gear being supported in a pivotal manner on the other of the second opposite lateral walling portions of the holder case, and a damper member including a meshing gear thereon to be meshed to the pinion gear, and being mounted on the other of the second opposite lateral walling portions of the holder case in such a manner that the pinion gear and the meshing gear are being meshed to each other, and the first constituent supporting member of the supporting mechanism includes a first rack geared portion thereon, while the second constituent supporting member of the supporting mechanism includes a second rack geared portion thereon, with the first rack geared portion of the first constituent supporting member and the second rack geared portion of the second constituent supporting member being meshed to the pinion gear in such a manner that the first rack geared portion of the first constituent supporting member and the second rack geared portion of the second constituent supporting member face each other, so that the first constituent supporting member and the second constituent supporting member of the supporting mechanism are able to be moved in a symmetrical and synchronous manner in the opposite width directions, respectively, of the electronic device.

10. The wireless power transfer holder according to claim 1, further comprising an elastic member being connected between the first constituent supporting member and the second constituent supporting member of the supporting mechanism, so that when the electronic device is being inserted and received in the receiving space in the holder case, the first constituent supporting member and the second constituent supporting member of the supporting mechanism are transmitting the bias forces being produced by the elastic member to the opposite side surfaces, respectively, of the electronic device.

* * * * *